UNITED STATES PATENT OFFICE.

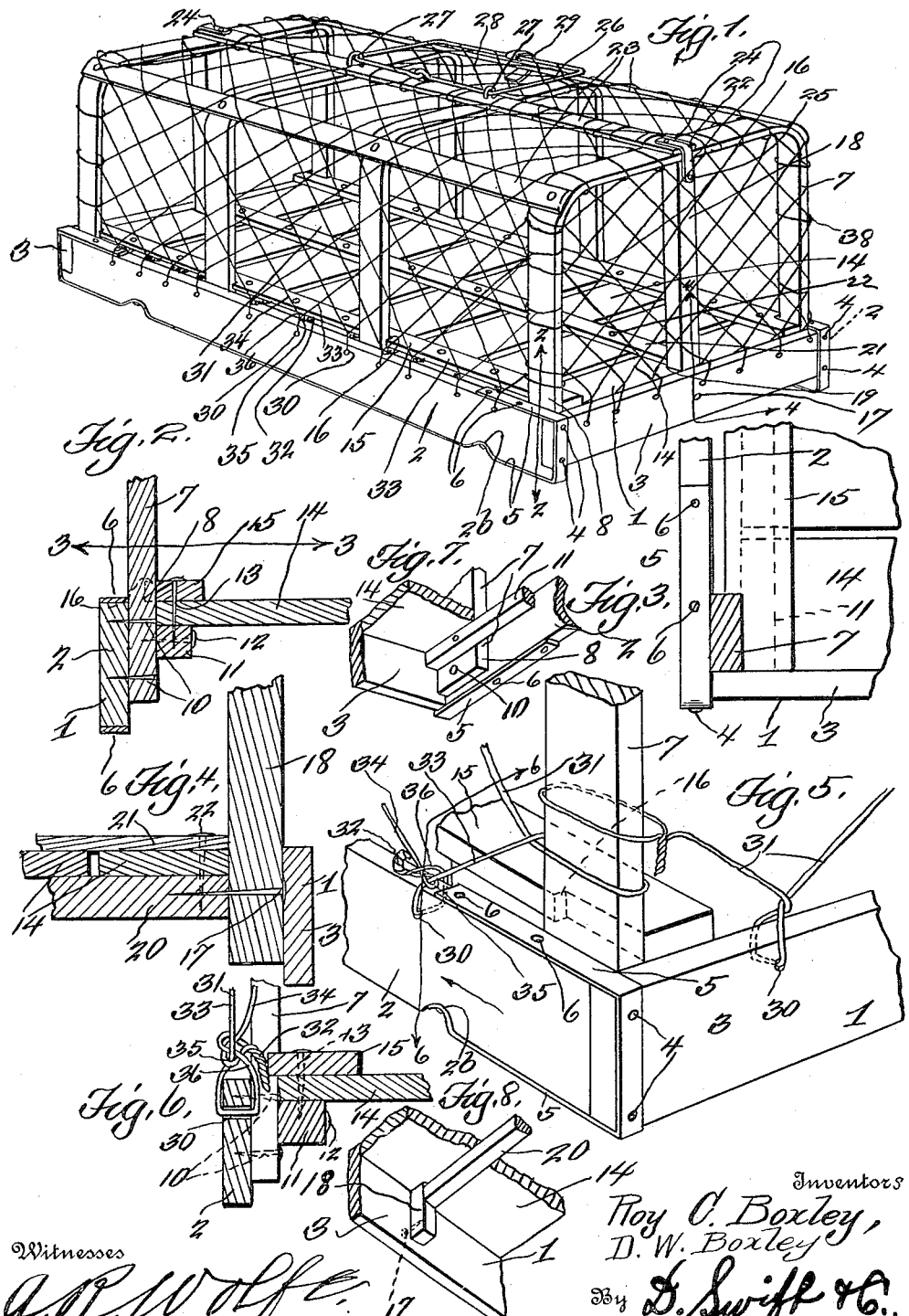

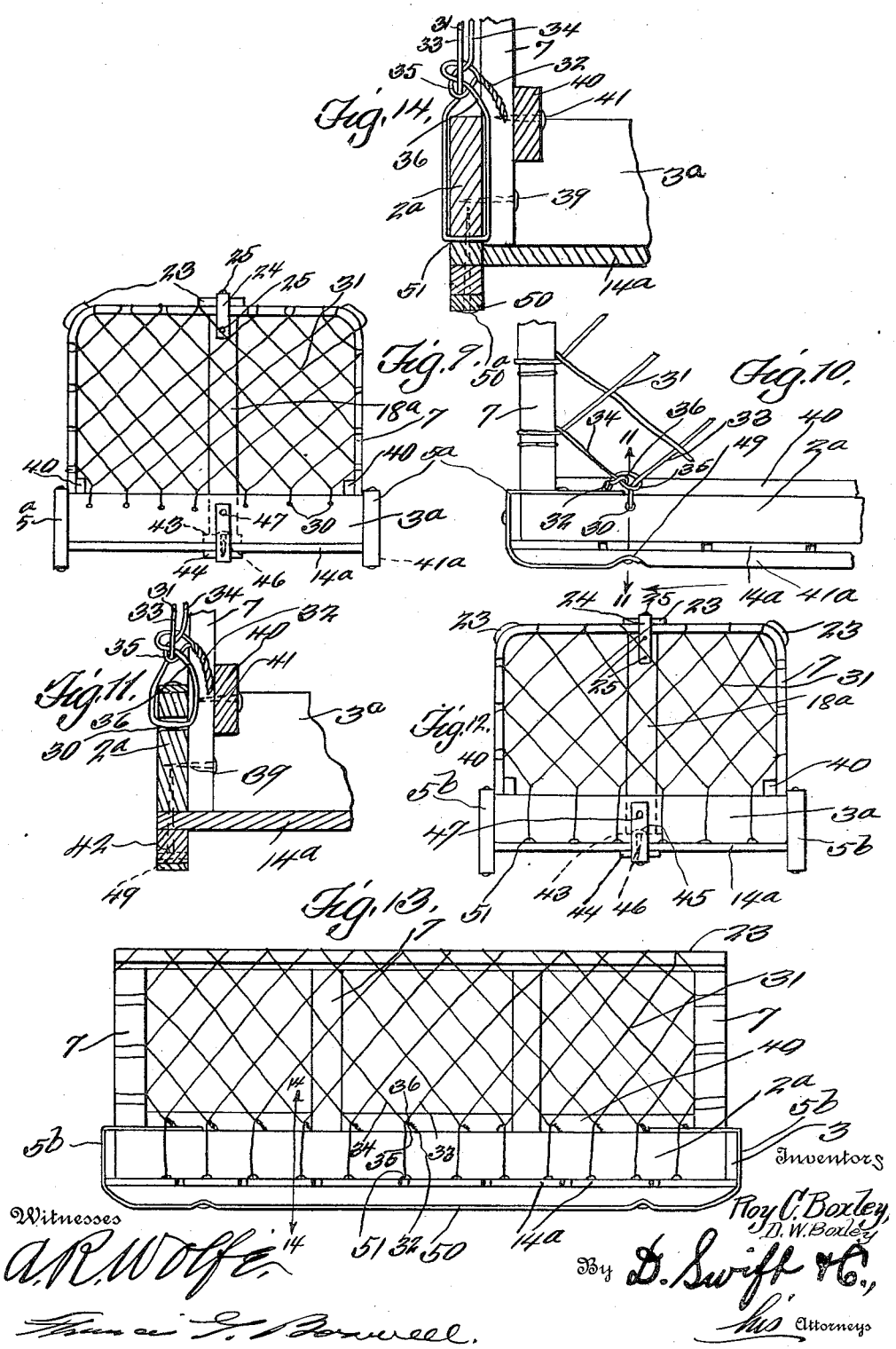

ROY C. BOXLEY AND DAVID W. BOXLEY, OF BUMPASS, VIRGINIA.

POULTRY-COOP.

1,127,583.     Specification of Letters Patent.     Patented Feb. 9, 1915.

Application filed February 6, 1914. Serial No. 816,989.

*To all whom it may concern:*

Be it known that we, ROY C. BOXLEY and DAVID W. BOXLEY, citizens of the United States, residing at Bumpass, in the county of Louisa and State of Virginia, have invented a new and useful Poultry-Coop; and we do hereby declare the following to be a full, clear, and exact description of the invention, such as will enable others skilled in the art to which it appertains to make and use the same.

This invention relates to the art of crates, boxes and the like, and particularly to a new and useful poultry coop or crate, designed for shipping commodities, more especially poultry and the like. This form of coop is constructed of wire and a suitable base, and heretofore in the weaving of the wire, there has been no protection made for the terminal ends of the wires, which would tend to scratch or prick or otherwise injure the poultry or the like, when coming in contact therewith.

Therefore, an object of the present invention is to provide protecting means for the twisted terminal ends of the wire mesh, in other words, guards for shielding said wire ends against being contacted with by the feet or the body of the poultry or the like. Said protecting means comprising longitudinal strips extending lengthwise of the coop, as shown in the drawings to prevent the poultry from being jagged or pricked by the twisted wire terminals or ends.

Another object of the invention is to afford a cheap, more efficient, practical, simple and desirable coop construction, having an exceedingly simple and cheap construction of base or bottom, preferably raised above the surface on which the coop rests.

In practical fields the details of construction may be subjected to alterations, falling within the scope of what is claimed.

The invention comprises further features and combination of parts, as hereinafter set forth, shown in the drawings and claimed.

In the drawings:—Figure 1 is a view in perspective showing the preferred form or construction of coop, embodying the features of the invention. Fig. 2 is a sectional view on line 2—2 of Fig. 1. Fig. 3 is a sectional view on line 3—3 of Fig. 2. Fig. 4 is a sectional view on line 4—4 of Fig. 1. Fig. 5 is an enlarged detail view in perspective of one corner of the coop, showing the arrangement of the wire mesh and how the twisted wire terminals are shielded. Fig. 6 is a sectional view on line 6—6 of Fig. 5, showing more particularly how the twisted wire terminals of the mesh work are protected. Fig. 7 is a detail perspective view of one corner of the coop, showing the same inverted. Fig. 8 is a detail perspective view of one end piece of the coop, showing the bottom construction and the same inverted. Fig. 9 is an end view of another form of coop, showing a differently constructed base or bottom, the bottom being a little lower than the bottom shown in Fig. 1. Fig. 10 is a side elevation of a portion of the coop shown in Fig. 9, showing the U-shaped brace strap with its end seated in a notch of the runner of the coop. Fig. 11 is a sectional view on line 11—11 of Fig. 10, showing the twisted terminal ends of the wire of the mesh shielded by a strip or guard. Fig. 12 is an end view of another form of the coop, also showing the bottom proper lowered, illustrating the wire mesh connected to the end strip of the bottom a little different. Fig. 13 is a side elevation of the form of coop shown in Fig. 12, showing the twisted terminal ends protected by a strip or guard. Fig. 14 is a sectional view on line 14—14 of Fig. 13.

Referring to the drawings, more especially to Figs. 1 to 8 inclusive, 1 designates the bottom or base of the coop, which comprises the longitudinal side strips 2 and the transverse end strips 3, secured together by the nails or other suitable means 4 being braced or reinforced by the U-shaped metal end straps 5, secured at 6. The arched members 7 have their end portions 8 secured to the side pieces of the base or bottom by means of the sprigs or the like 10. Also as shown longitudinal supporting pillars or strips 11 are secured to the lower ends 8 of the arched members 7 by the sprigs or the like 12. Secured to the pillars or supporting strips 11 by suitable sprigs, nails or the like 13 are the transverse boards or strips 14 which form the bottom of the coop. It will be seen by reference to Figs. 1 to 8 inclusive that the ends of the strips 14 are spaced apart from the side longitudinal strips 2. Secured to the upper end or faces of the boards or strips 14 are longitudinal strips 15 by means of the sprigs or the like 13. These strips 15 are provided with recesses 16 to receive the sides of the arch members 7, as shown clearly in Figs. 1, 2, 5 and 6. It will also be seen that the strips 15 are spaced apart from the longitudinal side pieces 2. Secured to the inner faces of the end strips 3 by means of suitable sprigs or the like 17 are the lower ends of the vertical standard 18, the end boards or strips 14 of the bottom proper of the coop are recessed or notched at 19 to receive said standards 18. Arranged upon the under face of the transverse boards 14 and extending longitudinally of the coop, but disposed centrally of the width of the coop is an elongated pillar or strip 20. Arranged upon the upper surfaces of the boards 14 and correspondingly disposed relative to the strip or pillar 20 is a strip 21, there being sprigs or the like 22 extending through the strips 21, the boards 14 and the pillar or strip 20, thereby securing such parts together. The arch members are connected by the longitudinal bars 23, there being angular clamps 24 bracing or reinforcing the end arched members and the central longitudinal bar 23 relative to one another, said angular braces being secured in place by the sprigs or the like 25. A closure member constructed of heavy wire designated by the numeral 26 is hinged to the central longitudinal bar 23 by the staples 27. This heavy wire closure member is provided with a mesh work of wire 28, and a clasp 29 to engage one of the bars 23 to hold the closure closed. As shown clearly in Figs. 1, 5 and 6 the side and end pieces 2 and 3 are provided with apertures 30, to receive the interwoven wire mesh work 31, which forms the inclosure of the coop. However, this wire mesh work 31 is so arranged on the frame of the coop that the ends or terminals of the wires terminate at the longitudinal side pieces, so that the strands after passing through the apertures 30 are twisted together as shown at 32, and the twisted ends bent down in the space between the ends of the boards 14 and the side pieces 2 and partially under the strips 15, which strips shield the fowl or poultry from contacting with the sharp jagged ends of the twisted terminals of the wire mesh work. Being more explicit, the diagonally arranged strands 33 are passed through the apertures 30, while the diagonally arranged strands 34 are twisted or coiled once about the strands 33 as shown at 35. The end portion 36 of the strand 33 is lapped over the strand 34, then the two ends or terminals of the strands are twisted together and bent down in said space, thereby obscuring the same.

In all the figures of the drawings the wire mesh work inclosure and the arched members and the longitudinal strips 23 connecting the arched members and the closure member are similarly constructed, the wire mesh work being looped as shown at 38 about the end arched members. However, the bottoms or bases of the other two forms of coops are similarly constructed, but different to the bottom or base shown in Figs. 1 to 8 inclusive. For instance, the transverse boards or strips 14$^a$ are secured to the lower edges of the longitudinal and transverse side and end pieces 2$^a$ and 3$^a$, as shown. However, the lower ends of the arch members 7 are secured by sprigs or the like 39 to the side pieces 2$^a$, while the standards 18$^a$ are secured to the end pieces 3$^a$, as shown in Figs. 9, 11 and 12. The strips 40 are secured at 41 to the lower end portions of the arched members, and act as shields or guards to protect the poultry from coming in contact with the twisted terminals or ends of the wire mesh work, which twisted terminals or ends are bent down between the strips 40 and the side pieces 2$^a$, as shown clearly in Fig. 11.

The two forms of coops shown in Figs. 9 to 13 inclusive are provided with runners 41$^a$, which are secured to the boards 14$^a$ and the side pieces 2$^a$ by means of the sprigs or the like 42. Secured to the upper and lower faces of the boards 14$^a$ are the longitudinally centrally arranged strips 43 and 44 disposed opposite one another and secured in place by the sprigs or the like 45, shown in dotted lines in Fig. 12. The angular straps 46 brace the strips 44 relative to the end pieces 3$^a$, said angular straps being secured in place by the sprigs 47.

In Figs. 1 and 5 the U-shaped straps 5 brace the side and end pieces. One end of each strap 5 being seated and secured in notches 2$^b$ of the side pieces.

In Fig. 10 the U-shaped straps 5$^a$ brace the side and end pieces and the runners 41$^a$. One end of each strap 5$^a$ seats and is secured in notches 49 of one end of each runner. These notches are for the purpose of preventing the ends of the straps from catching obstacles or the like, when sliding the coop. However, in Figs. 12 and 14 the lower portions of the straps 5$^b$ extend the full length of said runners, as shown at 50.

In Figs 12 and 13 the wire mesh work extends or wraps about the side and end pieces 2$^a$ and 3$^a$, and engages notches 51. However, the twisted terminals or ends of the strands 33 and 34 of the mesh work are connected and arranged in the same manner as previously set forth, as will be seen on examining Figs. 10 and 11 particularly.

The invention having been set forth, what is claimed as new and useful is:—

1. In a coop, the combination with a skeleton boarded bottom, of side and end pieces having apertures, arched members secured to the side pieces, a wire mesh work interwoven about the arched members and in engagement with the apertures of said side and end pieces and having the twisted terminals of the wires terminating adjacent the side pieces, U-shaped plates for reinforcing the side and end pieces, the lower edges of the side pieces at their ends having notches to receive the lower portions of the U-shaped plates, longitudinal strips secured to the lower ends of the arched members and adjacent to but spaced apart from the side pieces, and on which the boards of the skeleton bottom are secured, guard strips secured upon the upper surfaces of the boards of the skeleton bottom adjacent the side pieces and having recesses to receive the side portions of the arched members, said twisted terminals being designed to be bent down in said spaces between the longitudinal strips and the side strips and shielded by the guard strips.

2. In a coop, the combination with a skeleton boarded bottom, of side and end pieces, U-shaped plates reinforcing the side and end pieces, the lower edges of the side pieces adjacent their ends having notches to receive and in which the lower portions of the U-shaped plates are secured, arched members secured to the side pieces, a wire mesh work interwoven about the arched members and in engagement with the side and end pieces and having the twisted terminals of the wires terminating adjacent the side pieces, and guard strips shielding the twisted terminals of the wires and secured adjacent the arched members.

3. In a coop, the combination with a skeleton boarded bottom, of side and end pieces, the lower edges of the side pieces adjacent their ends having notches, plates arranged in engagement with the lower edges of the side pieces and being bulged, which bulges are secured in said notches, said plates at the corners of the coop extending vertically upwardly and overlying said end pieces and being bent to engage and secured to the upper edges of the side pieces to reinforce the side and end pieces, arched members secured to the side pieces, a wire meshwork for the frame of the coop and in engagement with the side and end pieces and having twisted terminals of the wires terminating adjacent the side pieces, and guard strips shielding the twisted terminals and secured adjacent the arched members.

In testimony whereof we have signed our names to this specification in the presence of two subscribing witnesses.

ROY C. BOXLEY.
DAVID W. BOXLEY.

Witnesses:
JOHN H. McCANDLISH,
TOMAS L. BUMPASS.

Copies of this patent may be obtained for five cents each, by addressing the "Commissioner of Patents, Washington, D. C."